US007802260B1

(12) United States Patent
Quinn et al.

(10) Patent No.: US 7,802,260 B1
(45) Date of Patent: Sep. 21, 2010

(54) RECEIVER-PROCESSOR-DISPATCHER MECHANISM FOR INBOUND CONNECTORS

(75) Inventors: Timothy J. Quinn, Lake Forest, IL (US); Venkateswar Amirisetty, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1050 days.

(21) Appl. No.: 10/914,402

(22) Filed: Aug. 9, 2004

Related U.S. Application Data

(60) Provisional application No. 60/577,739, filed on Jun. 7, 2004.

(51) Int. Cl.
*G06F 9/44* (2006.01)

(52) U.S. Cl. .................................. 719/313; 419/328

(58) Field of Classification Search ................. 719/310, 719/313, 328; 709/203, 217, 219
See application file for complete search history.

(56) References Cited

U.S. PATENT DOCUMENTS

| | | | | |
|---|---|---|---|---|
| 6,829,771 B1 * | 12/2004 | Bahrs et al. | ................. | 719/318 |
| 6,854,122 B1 * | 2/2005 | Sheriff et al. | ............... | 719/316 |
| 6,922,796 B1 * | 7/2005 | Matena et al. | ................ | 714/48 |
| 6,968,535 B2 * | 11/2005 | Stelting et al. | .............. | 717/104 |
| 6,976,061 B1 * | 12/2005 | Sharma | ....................... | 709/220 |
| 7,040,508 B2 * | 5/2006 | Woersdoerfer et al. | ......... | 222/94 |
| 7,130,885 B2 * | 10/2006 | Chandra et al. | ............. | 709/206 |
| 7,206,827 B2 * | 4/2007 | Viswanath et al. | .......... | 709/220 |
| 7,275,079 B2 * | 9/2007 | Brodsky et al. | ............. | 709/203 |
| 7,426,548 B2 * | 9/2008 | Griffin et al. | ................ | 709/219 |
| 7,454,459 B1 * | 11/2008 | Kapoor et al. | .............. | 709/203 |
| 2003/0018832 A1 * | 1/2003 | Amirisetty et al. | .......... | 709/328 |
| 2003/0023752 A1 * | 1/2003 | Williamson et al. | ......... | 709/245 |
| 2003/0093402 A1 * | 5/2003 | Upton | ........................... | 707/1 |
| 2003/0120593 A1 * | 6/2003 | Bansal et al. | ................. | 705/39 |
| 2003/0195997 A1 * | 10/2003 | Ibert et al. | ................... | 709/318 |
| 2004/0243693 A1 * | 12/2004 | Beisiegel et al. | ............ | 709/220 |

(Continued)

OTHER PUBLICATIONS

Monson-Haefel, Richard. Enterprise JavaBeans, 3rd Edition. O'reilly Publishing, Inc. Sep. 2001. Chapter 13: Message-Driven Beans.*

(Continued)

*Primary Examiner*—Van H Nguyen
(74) *Attorney, Agent, or Firm*—Robert C Kowert; Meyertons, Hood, Kivlin, Kowert & Goetzel, P.C.

(57) ABSTRACT

System and method for receiving inbound messages from external systems and delivering the messages to applications within application servers are described. Embodiments may provide implementations of a Receiver-Processor-Dispatcher (RPD) architecture for inbound connectors that segments the work of delivering inbound messages from an Enterprise Information System (EIS) to an application into the discrete stages of receiving messages from the EIS, processing the messages to determine which components in the application should receive the messages, and dispatching the messages to the components. The delivery of messages from an EIS to an application is performed by receiver, processor, and dispatcher components of an RPD connector. RPD connectors implemented according to the RPD architecture may provide a common framework for delivering messages from an EIS to an application. Developers may implement RPD connectors according to the common framework, while customizing the RPD connectors according to the particular requirements of the EIS and/or application.

44 Claims, 8 Drawing Sheets

U.S. PATENT DOCUMENTS

2004/0249644 A1* 12/2004 Schiefer et al. ............... 705/1
2004/0267933 A1* 12/2004 Przybylski et al. .......... 709/227
2005/0028164 A1* 2/2005 Neuwald et al. ............ 719/310
2005/0050155 A1* 3/2005 McGee et al. ............... 709/213

OTHER PUBLICATIONS

Jennifer Rodoni, "What's New in the J2EE Connector Architecture 1.5," http://javasun.com/developer/technical/Articles/J2EE/connectoarch1, Mar. 2003, (8 Pages).

* cited by examiner

RECEIVER-PROCESSOR-DISPATCHER MECHANISM FOR INBOUND CONNECTORS

This application claims priority to U.S. Provisional Application No. 60/577,739, filed Jun. 7, 2004, entitled "RECEIVER-PROCESSOR-DISPATCHER MECHANISM FOR INBOUND CONNECTORS".

BACKGROUND OF THE INVENTION

1. Field of the Invention

This invention relates to application servers, and more particularly to connectors that interface between application servers and other systems.

2. Description of the Related Art

The Java 2 Enterprise Edition (J2EE) is a family of standards that describes how application servers work with Java programs. If a Java developer writes an application according to these conventions, then that application can be run more securely and efficiently inside the application server. In addition, the application server takes care of many common tasks that the Java program would otherwise have to take care of itself, allowing the developer to concentrate on the specifics of an application.

One of these common facets has to do with how application servers and the Java programs that run inside them integrate with software that does not follow the J2EE standards. These could include Java programs that were not built to comply with the J2EE standard as well as programs written in languages other than Java. The J2EE Connector Specification describes the features that application servers must provide to allow J2EE applications to work with these other software systems, referred to as Enterprise Information Systems (EISs). The J2EE Connector Specification also describes how J2EE applications may make use of those application server features to work with an EIS. A key aspect of the overall solution is the concept of a connector (or resource adapter) that lies between the J2EE application and a particular type of EIS. The connector acts a bridge between the J2EE part of the solution and the EIS. A J2EE connector allows a J2EE application written according to the J2EE rules to work with an EIS that was not written that way. A J2EE connector for a particular EIC understands both the J2EE rules and how to work with the particular EIS. The J2EE connector links them in a way that works for both the J2EE application and the EIS.

FIG. 1 illustrates an implementation of a connector according to the J2EE Connector Specification. Connector 106 acts as a bridge between the J2EE container 100 and the application 102 on the one side and the application programming interface (API) 112 of the EIS 114 on the other side. The J2EE Connector Specification prescribes the service provider interface (SPI) 110 contract between the connector 106 and the container 100 and the optional common client interface (CCI) 108 between the connector 106 and the client application 102. Because the APIs for EISs are so varied, the J2EE Connector Specification requires no specific interfaces or behavior between the connector 106 and the EIS 114. Note that the J2EE Connector Specification mandates that the connector deliver incoming messages only to one or more message-driven beans (MDBs) 104.

The J2EE Connector Specification describes both outbound and inbound communication between the J2EE application and the external EIS. Outbound communication occurs when the J2EE application initiates the contact with the EIS. Typically, the J2EE application, during its execution, needs to use some function or service provided by the EIS. In a sense, the EIS is passive in this scenario, waiting for the J2EE application to request some work of it.

With inbound communication, the EIS initiates the contact with the J2EE application. Some business event may become known within the EIS (the creation of a new purchase order, for example) and the J2EE application needs to become aware of that business event. The EIS takes an active role in this scenario, and the EIS initiates the contact with the J2EE application at a time of its choosing. In practice, different EISs may use different techniques for communicating with other software to accomplish inbound communication (from the EIS to the J2EE application). For example, some EISs may send messages over a network connection to a specific network port, and others may deposit files in specified directory. As a result, even though some of the logic inside a connector can be common to many or even all connectors, some connector logic will always depend on the particular EIS.

When an enterprise application calls a function of an EIS, it uses the connector's outbound connectivity. In general, the application obtains a logical connection from the connector, and through that logical connection requests the connector to invoke one or more functions that the EIS makes available through its API. Results of the API function are returned from the EIS API to the connector that returns them to the application. Note that the enterprise application initiates the exchange with the EIS, using the connector as an intermediary.

When an enterprise application accepts messages from an EIS, it uses the connector's inbound connectivity. The connector, without any direct instigation by the application, sets up a physical connection to the EIS. As the EIS runs, it can send messages to the connector over this connection. As it receives each message, the connector delivers the message to the application. Note that here the EIS initiates the exchange of information with the application, using the connector as an intermediary.

The J2EE Connector Specification includes several interfaces and mandates in considerable detail the behavior required in the application and the connector for handling outbound connectivity. Further, the specification mandates that the connector deliver incoming messages only to one or more message-driven beans (MDBs) that are part of the application. Because the administrator can deploy several connectors and several applications with MDBs into a container, the specification requires that the container's deployment tool allow the administrator to form associations between specific MDBs in applications and specific connectors. The J2EE Connector Specification refers to these logical associations as message endpoints. The specification allows a single MDB to serve as more than one message endpoint, even to the same connector.

The specification also prescribes the API the connector must use to deliver messages to MDBs. Beyond this, the specification says very little else about how the connector should handle inbound connectivity internally. The developer—or generator—of the connector may use any useful approach that accepts messages from the EIS and delivers them in a specification-compliant way to the application's MDBs. In particular, the specification does not address how a connector solicits and accepts messages from an EIS, how the connector selects which message endpoints should receive a particular incoming message, or how the connector manages delivery of message to the selected MDBs.

SUMMARY

Embodiments of a system and method for receiving inbound messages from external systems such as Enterprise Information Systems (EISs) and delivering the messages to applications within application servers are described. Embodiments may provide implementations of a Receiver-Processor-Dispatcher (RPD) architecture for inbound connectors that segments the work of delivering inbound messages from an EIS to an application into the discrete stages of receiving messages from the EIS, processing the messages to determine which components in the J2EE application should receive the messages, and dispatching the messages to the components. Inbound connectors implemented according to the RPD architecture may be referred to as RPD connectors.

RPD connectors implemented according to the RPD architecture may provide a common framework for delivering inbound messages from an EIS to an application. Components and/or mechanisms that are common to all EIS/Application interfaces may be implemented in all RPD connectors according to the RPD architecture. Specific RPD connectors may also include components and/or mechanisms that are specific to the requirements of the EIS and/or application. Thus, developers may implement RPD connectors according to the common framework, while customizing the RPD connectors according to the particular requirements of the EIS and/or application.

The delivery of inbound messages from an EIS to an application is performed by the receiver, processor, and dispatcher components of an RPD connector. The receiver receives incoming messages from the EIS. The receiver may encapsulate all dependencies on the particular EIS API. The receiver may also be responsible for keeping the connection to the EIS open. The processor processes each incoming message to choose which candidate message endpoint(s) should receive this message and, in one embodiment, creates a separate dispatcher for each destination. A dispatcher handles the physical delivery of a single message to a single message endpoint. A dispatcher may encapsulate all dependencies on the associated MDB. Note that there may be more than one dispatcher.

RPD connectors may be written manually by a developer or, in one embodiment, generated using an RPD connector builder mechanism. An RPD connector builder mechanism may accept information specific to an EIS/application interface and automatically generate a custom RPD connector for the EIS/application interface according to the specific information.

In one embodiment, the RPD architecture may include a sequencer component for use in RPD connectors that may be used to specify whether the processor runs synchronously or asynchronously with the receiver and whether the dispatcher(s) run synchronously or asynchronously with each other and the processor. In one embodiment, the default behavior of the sequencer implements strictly serial message handling as described above, and developers may provide alternative implementations if they want their RPD connectors to behave differently.

Note that while embodiments are generally described herein for J2EE application server environments and connectors that conform to the J2EE Connector Specification, embodiments of connectors implemented according to the RPD architecture may be used in other environments and for connectors conforming to other connector specifications. In general, connectors implemented according to the RPD architecture may be used in any scenario for delivering messages of any type from a source to a destination.

Figure 1:
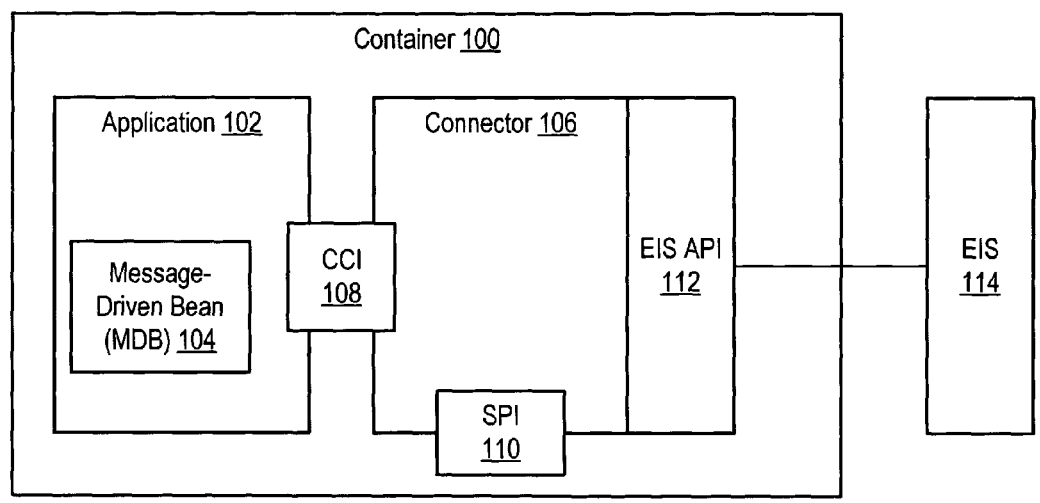
FIG. 1 illustrates an implementation of a connector according to the J2EE Connector Specification.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for receiving inbound messages from external systems such as Enterprise Information Systems (EISs) and delivering the messages to applications within application servers are described. A connector accepts messages that originate from an external back-end system (referred to herein as an Enterprise Information System, or EIS), and then uses interfaces defined in the J2EE Connector Specification to deliver the messages to the application. Embodiments may provide implementations of a Receiver-Processor-Dispatcher (RPD) architecture for inbound connectors that segments the work of delivering inbound messages from an EIS to an application into the discrete stages of receiving messages from the EIS, processing the messages to determine which components in the J2EE application should receive the messages, and dispatching the messages to the components. Inbound connectors implemented according to the RPD architecture may be referred to as RPD connectors.

RPD connectors implemented according to the RPD architecture may provide a common framework for delivering inbound messages from an EIS to an application. Components and/or mechanisms that are common to all EIS/Application interfaces may be implemented in all RPD connectors according to the RPD architecture. Specific RPD connectors may also include components and/or mechanisms that are specific to the requirements of the EIS and/or application.

Thus, developers may implement RPD connectors according to the common framework, while customizing the RPD connectors according to the particular requirements of the EIS and/or application.

In one embodiment, the RPD architecture may include a sequencer component for use in RPD connectors that may be used to specify whether the processor runs synchronously or asynchronously with the receiver and whether the dispatcher(s) run synchronously or asynchronously with each other and the processor. In one embodiment, the default behavior of the sequencer implements strictly serial message handling as described above, and developers may provide alternative implementations if they want their RPD connectors to behave differently.

In one embodiment, the RPD architecture may be implemented as classes in an object-oriented programming language, such as the Java programming language. The components of an RPD connector including, but not limited to, the receiver, processor, and dispatcher, may be instances of the classes that may, if necessary, include extensions to the classes for supporting the particular requirements of the EIS/application interface.

RPD connectors may be written manually by a developer or, in one embodiment, generated using an RPD connector builder mechanism. An RPD connector builder mechanism may accept information specific to an EIS/application interface and automatically generate a custom RPD connector for the EIS/application interface according to the specific information. An exemplary RPD connector builder mechanism for generating RPD connectors is described herein.

Note that while embodiments are generally described herein for J2EE application server environments and connectors that conform to the J2EE Connector Specification, embodiments of connectors implemented according to the RPD architecture may be used in other environments and for connectors conforming to other connector specifications. In general, connectors implemented according to the RPD architecture may be used in any scenario for delivering messages of any type from a source to a destination.

Figure 2:
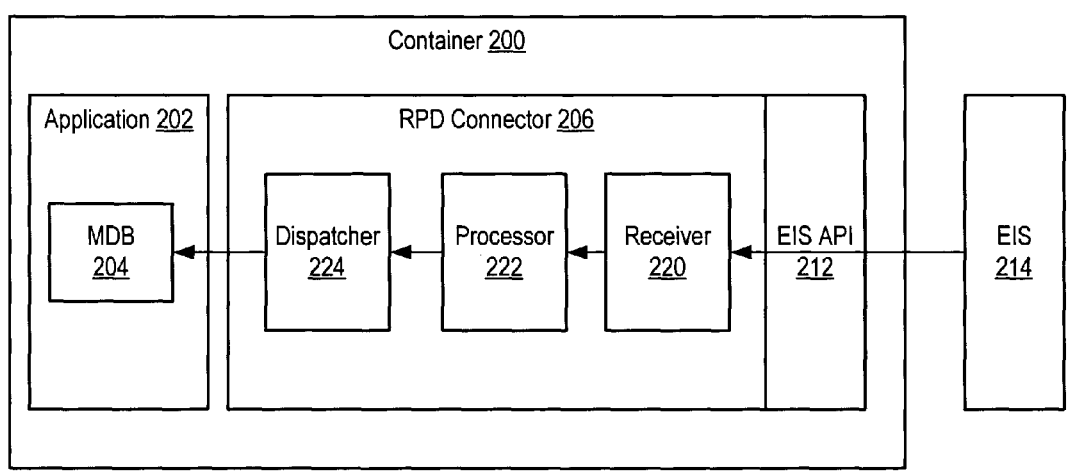
FIG. 2 illustrates an RPD (receiver-processor-dispatcher) connector according to one embodiment.
Figure 3A:
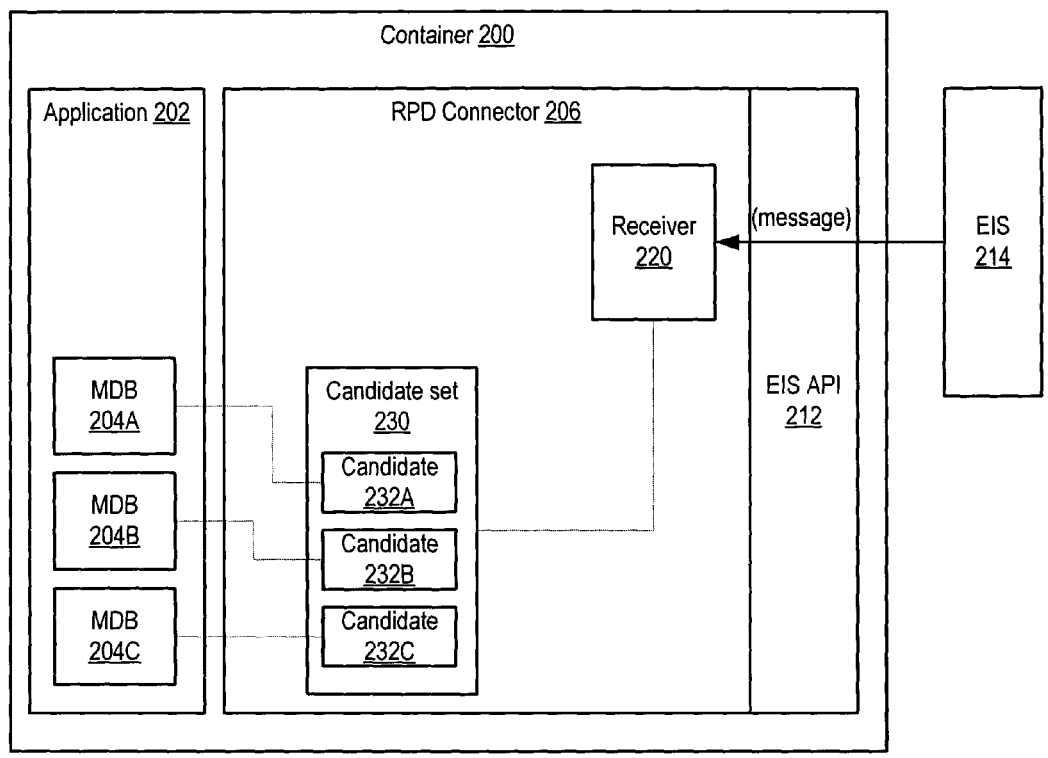
FIGS. 3A-3C illustrate an RPD connector delivering a message from an EIS to to an application according to one embodiment.
Figure 3B:
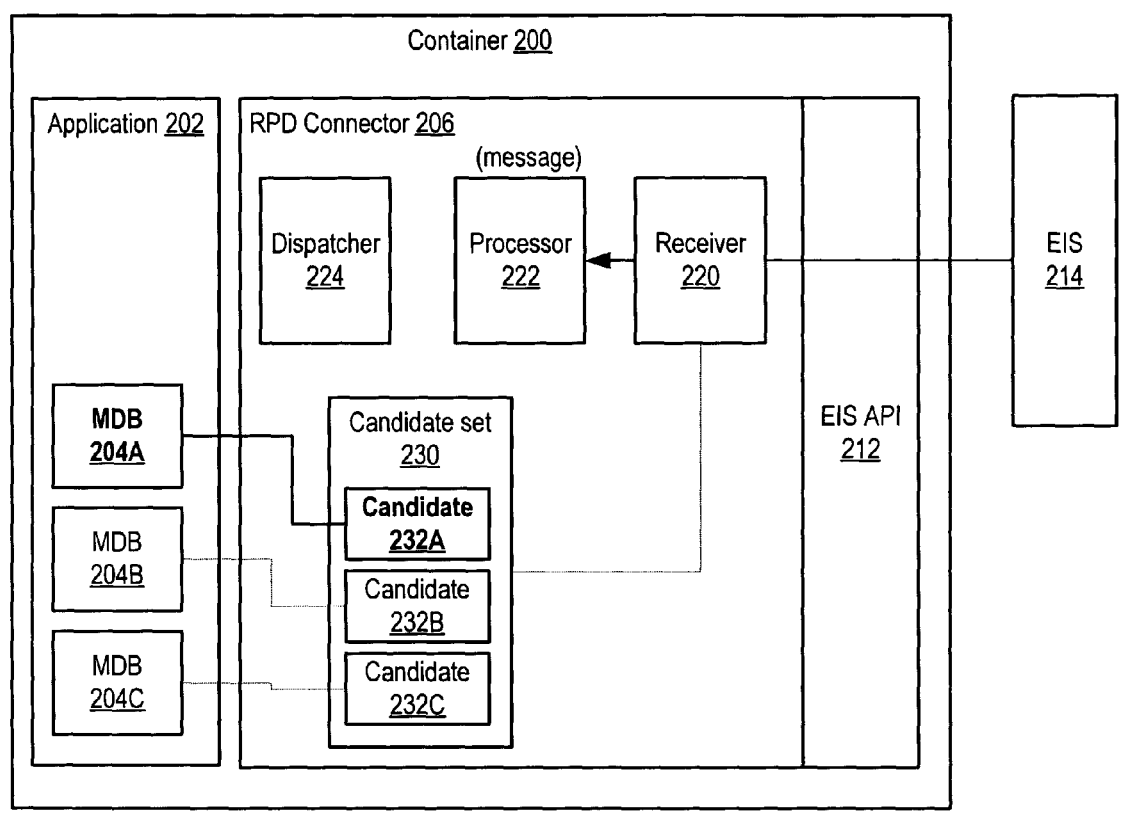
Figure 3C:
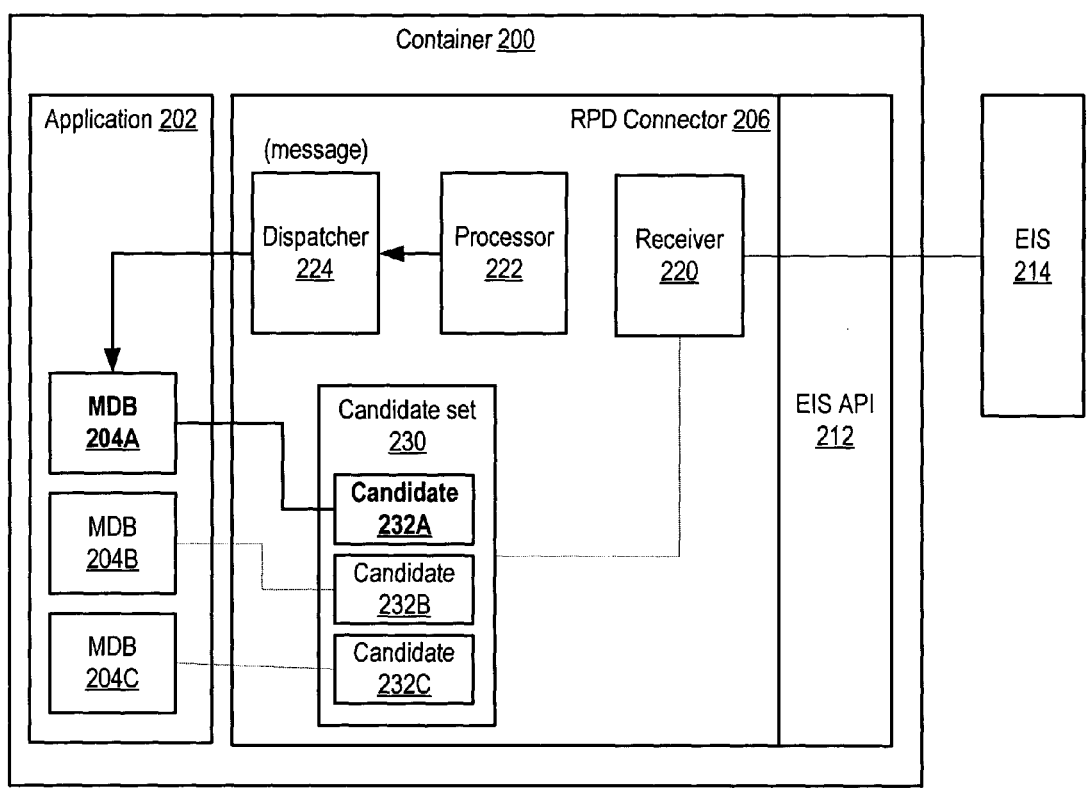
Figure 4:
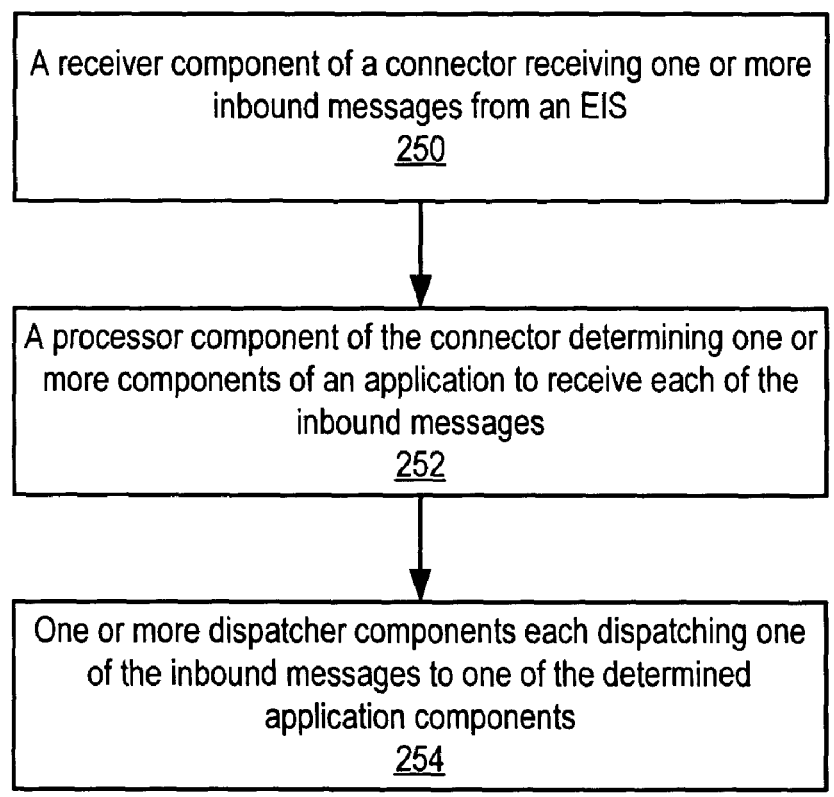
FIG. 4 is a flowchart of a method for handling incoming messages in an RPD connector according to one embodiment.

FIGS. 2 through 4 illustrate means for receiving inbound messages from an EIS, means for determining one or more components of an application to receive each of the inbound messages, and means for dispatching the inbound messages to the determined application components.

FIG. 2 illustrates an RPD connector according to one embodiment. The delivery of inbound messages from EIS 214 to application 204 is performed by the receiver 220, processor 222, and dispatcher 224 components of RPD connector 206. Receiver 220 receives incoming messages from the EIS 214. Receiver 220 may encapsulate all dependencies on the particular EIS API 212. Receiver 220 may also be responsible for keeping the connection to the EIS 214 open. Processor 222 processes each incoming message to choose which specific MDBs should receive this message and, in one embodiment, creates a separate dispatcher 224 for each destination. A dispatcher 224 handles the physical delivery of a single message to a single message endpoint. A dispatcher 224 may encapsulate all dependencies on the associated MDB 204. Note that there may be one or more MDBs 204 and one or more dispatchers 224.

In one embodiment, an RPD connector 206 may include a mechanism or mechanisms for using the receiver 220, processor 222 and dispatcher 224 components in specific, well-defined ways. For example, the container 200 may inform the RPD connector 206 during its own start-up as well as during each message endpoint activation. RPD connector 206 may include a mechanism that may employ the receiver 220, the processor 222, and the dispatcher 224 at the appropriate times and in the appropriate order to successfully deliver EIS messages to the application 202.

In one embodiment, receiver 220 may act to ensure that the RPD connector 206 maintains an open connection to the EIS 214 over which a flow of messages can arrive from the EIS 214. During initialization, the RPD connector 206 may invoke the receiver 220's "open" method that uses the EIS API 212 to establish a connection between the EIS 214 and the RPD connector 206. As it runs, the receiver 220 may detect failures in the connection and attempt to re-establish the connection.

Depending on the EIS 214, and in some cases on the connector developer's choice, the RPD connector 206 may start the receiver 220 during RPD connector 206 start-up or during endpoint activation. The receiver 220 accesses information it needs to give the EIS APT 212 in order to connect the EIS 214. This connection information may be available as configuration properties of the RPD connector 206, the message endpoint, or both. In one embodiment, the RPD connector 206 may start a receiver 220 during RPD connector 206 startup only if all connection-related configuration is defined as RPD connector 206 configuration properties. If any information needed to open the connection comes from the message endpoint configuration, then the RPD connector 206 waits until endpoint activation to start the receiver 220.

In one embodiment, receiver 220 may accept each arriving message and submit it to the rest of the RPD connector 206 for ultimate delivery to message endpoints. Some EIS APIs 212 may require the receiver 220 to register a listener object that will be informed as each new message arrives. Other EIS APIs 212 may offer a method that the receiver 220 may invoke each time it seeks to read a newly arrived message. In this second case, the developer may specify, for example to an RPD connector builder mechanism, that explicit action is required to obtain an incoming message. In one embodiment, RPD connector 206 may periodically execute a timed task that invokes the receiver 220's read method. In any case, once the receiver 220 obtains a new message from the EIS 214, it makes the message available to the RPD connector 206 as a whole by invoking an "on read complete" method. In one embodiment, the "on read complete" method may be implemented by the receiver's superclass.

In one embodiment, receiver 220 may close the connection to the EIS 214 when requested. Most EIS APIs 212 provide a method the receiver 220 may invoke to sever the physical connection to the EIS 214. In one embodiment, the receiver class may provide a "close" method that the developer may customize to use the particular EIS API 212 to disconnect from the EIS 214. In one embodiment, if the RPD connector 206 started a receiver 220 during RPD connector 206 start-up, receiver 220 may invoke "close" during RPD connector 206 shutdown. If the RPD connector 206 started a receiver 220 during endpoint activation, then receiver 220 may invoke "close" during the deactivation of that same message endpoint.

In one embodiment, receiver 220 may extract transaction-related information from a message when requested. The J2EE Connector Specification allows the EIS 214 to start a global XA transaction and furnish the transaction ID (Xid) in the incoming message, at which time the connector must forward the Xid to the container so the application may join the transaction. However, the J2EE Connector Specification does not specify how the Xid will appear in the message. There may be an EIS API 212 method the receiver 220 may invoke to obtain the Xid. Alternatively, the Xid may be embedded in the message body from which the receiver 220 may extract by using knowledge of the message format used by the EIS 214.

In one embodiment, receiver 220 may include a "prepare execution context" method as a default implementation that returns null. The developer may customize this method if the EIS API 212 or the message format provides transaction IDs. The processor 222 class may call this method as part of message processing, described below.

In one embodiment, receiver 220 may provide an XAResource object. In certain recovery scenarios, the RPD connector 206 provides an XAResource to the container 200 that the container 200 may use for recovering outstanding transactions. The EIS API 212 may provide its own XAResource implementation, or it may provide other classes or methods that accomplish the same effect. In one embodiment, the receiver 220, as the sole point of contact between the EIS 214 and the RPD connector 206, the container 200, and the application 202, may provide an XAResource for this purpose.

In one embodiment, receiver 220 may include a "prepare XA Resource" method as a default implementation that returns null. The developer may customize this method if the EIS API 212 provides either an XAResource implementation of its own or functionally equivalent methods on other classes. The receiver 220's "prepare XA Resource" method may be invoked when the container 200 asks the RPD connector 206 to participate in transaction recovery.

The aspects of the receiver 220 described above may depend directly on the particular EIS API 212 and/or the EIS message format. Further, in one embodiment, all dependencies on the EIS 214 are collected together into the receiver 220. The developer may customize the receiver 220 using the specifications of the particular EIS API 212 to define and implement the receiver 220's responsibilities. Even so, much of what a receiver 220 does is the same for all EISs/EIS APIs. As a result, the developer may need to customize only certain aspects of the receiver 220 to achieve a fully functioning RPD connector 206, in particular opening a connection, reading a message, and closing the connection.

In one embodiment, the RPD architecture may include a network endpoint manager component of RPD connectors that provides a specific way for communicating with the EIS. In one embodiment, the network endpoint manager component creates and initializes receivers when and how they are needed.

EIS APIs 212 may exhibit two styles of interaction with the receiver 220:

callback, in which a listener object is registered with the EIS API 212 and the EIS API 212 invokes a method on the listener as each new message arrives; and recurring read, in which the EIS API 212 is explicitly requested to provide the next incoming message.

The RPD architecture and the RPD connectors 206 implemented according to the RPD architecture may be used to provide receivers 220 that may follow either or both styles of interaction. In one embodiment, a "callback" receiver 220 may be invoked by the EIS 214 when the EIS 214 needs to send information to the RPD connector 206. Typically, as the receiver 220 is initialized during the RPD connector's start-up, the receiver 220 may register itself with the EIS 214 so the EIS 214 knows it is there and that it is interested in receiving messages. When a message becomes available, the EIS 214 calls back to the receiver 220 to report the arrival of the message. Once a callback receiver 220 has registered its interest with the EIS 214, it is largely passive, waiting for the EIS 214 to callback to it.

Some EISs may require the receiver 220 to actively check whether new messages from the EIS 214 have arrived. To handle this, a "recurring read" receiver 220 may use a timer to trigger repeating checks for new messages. In one embodiment, developers may define periodic receivers 220 that check according to a fixed schedule. The generated logic may be customized to build a more general recurring read receiver 220 that might not be strictly periodic. For instance, if messages from the EIS 214 are known to have distinct high- and low-traffic intervals, then the receiver 220 might check less frequently if it finds no messages waiting. Conversely, the receiver 220 might check more frequently during times when it finds messages waiting for it. This approach may be useful, for example, if the operation of checking for a new message takes a long time or places a heavy demand on system resources.

FIGS. 3A-3C illustrate an RPD connector delivering a message from an EIS to an application according to one embodiment. FIG. 3A illustrates receiver 220 of RPD connector 206 accepting an incoming message from EIS 214 according to one embodiment. In one embodiment, RPD connector 206 may have created a candidate set 230 of message endpoints, in this example candidates 232A, 232B, and 232C, which may represent, respectively, MDBs 204A, 204B, and 204C. In one embodiment, the RPD connector 206 may have populated the candidate set 230 with candidates 232 when the container 200 informed the RPD connector 206 of the endpoint activations corresponding to MDBs 204.

FIG. 3B illustrates a processor processing a message according to one embodiment. In one embodiment, after the receiver 220 has accepted a message from the EIS 214, the message is handed off to the processor 222. In one embodiment, the receiver 220 invokes an "on read complete" method that submits the message to the RPD connector 206 for handling. The RPD connector 206 then creates a processor 222 as an instance of a processor class and invokes the processor 222's "process message" method.

In one embodiment, the processor 222 may choose from the candidate message endpoints (candidates 232) in candidate set 230 one or more message endpoints (candidate 232A, in this example) that are to receive the message. Although the administrator associated message endpoints with the RPD connector 206 when the application was deployed, the developer may not want each of the RPD connector 206's active message endpoints to receive every message from the EIS 214. In one embodiment, the message is passed to the processor 222's "select recipients" method, which returns a collection of active message endpoints that should be sent the message. In one embodiment, the default behavior for the "select recipients" method is to choose all eligible, active message endpoints. In FIG. 3B, the processor 222 has selected only one candidate 232A from candidate set 230 as the message endpoint to receive the particular incoming message. This is represented by the bold line linking candidate 232A with MDB 204A, while the lines between the other candidates 232 and MDBs 204 remain light. Note that one or more message endpoints may be selected.

In one embodiment, the processor 222 may use the receiver 220 to extract any transactional information from the message. In one embodiment, the processor 222 may invoke a "prepare execution context" method of the receiver 220 to obtain transactional information from the message.

In one embodiment, the processor 222 may arrange for delivery of the message to each selected message endpoint. One embodiment may use a separate dispatcher 224 to handle delivery of a single message to a single message endpoint. In one embodiment, the processor 222 may create a dispatcher 224 for each appropriate message endpoint and submit the collection of dispatchers 224 to the RPD connector 206 for execution. In one embodiment, the default implementation simply instantiates a dispatcher 224 for each selected recipient and then submits them.

FIG. 3C illustrates a dispatcher delivering a message to the application according to one embodiment. In one embodiment, each dispatcher 224 is responsible for delivering a single message to a single message endpoint. After the processor 222 creates dispatcher(s) 224 and submits them to the RPD connector 206, the RPD connector 206 arranges for each dispatcher 224's "deliver" method to be invoked. In one embodiment, the "deliver" method invokes a method on the message endpoint to convey the message.

The J2EE Connector Specification defines the Java interface javax.resource.cci.MessageListener as a generic interface that any MDB may implement. During RPD connector definition, the developer may specify the Java type of the MDB interface. In one embodiment, if an RPD connector builder mechanism is being used, the Java type of the MDB interface may be specified through the RPD connector builder mechanism's user interface. If the developer chooses javax.resource.cci.MessageListener as the MDB's interface type, then the RPD connector builder mechanism may generate the RPD connector's dispatcher class entirely. In many if not most cases, the developer may not need to customize the dispatcher. However, if the developer specifies a different Java type for the MDB's interface, then the RPD connector builder mechanism may not be able to determine how to deliver the message to the MDB. In this case, the developer may customize the "deliver" method of the dispatcher to deliver the message.

FIG. 4 is a flowchart of a method for handling incoming messages from an EIS in an RPD connector according to one embodiment. A receiver component of the RPD connector may maintain a connection to the EIS. As indicated at 250, the receiver component may receive one or more inbound messages from the EIS. The receiver component may receive the one or more inbound messages via an EIS application programming interface (API) for the EIS. In one embodiment, the receiver component encapsulates all dependencies of the RPD connector on the EIS.

As indicated at 252, a processor component of the RPD connector may determine one or more components (e.g. MDBs) of the application to receive each of the inbound messages. In one embodiment, the RPD connector may create the processor component after the receiver component receives the inbound messages from the EIS. In one embodiment, to determine the component(s) to receive the inbound messages, the processor component selects one or more message endpoints indicating the application components from a set of message endpoints maintained by the RPD connector. Each message endpoint indicates one of the application components as a destination for incoming messages from the EIS.

As indicated at 254, one or more dispatcher components of the connector may each dispatch one of the inbound messages to one of the determined application components. In one embodiment, the RPD connector may create the dispatcher components after the processor component determines the application components to receive the inbound messages. In one embodiment, each dispatcher component encapsulates all dependencies of the RPD connector on the corresponding application component.

In one embodiment, the receiver component, processor component, and dispatcher component(s) may process incoming messages serially. In this embodiment, the receiver component waits for the dispatcher component(s) to deliver the inbound messages before accepting a next inbound message from the EIS. In one embodiment, the receiver component, processor component, and dispatcher component(s) may process incoming messages asynchronously. For example, the receiver component may accept a next inbound message from the EIS before the dispatcher component(s) deliver the inbound messages.

Sequencing Message Handling within the RPD Connector

As described above, the stages of message handling—receipt, processing, and dispatching—occur serially. The receiver that accepts a message waits for the RPD connector to processes the message before accepting the next message. The processor waits for all of the dispatchers to complete before returning to the receiver. This serial method of message handling is a "safe" method of message handling, in that any error that occurs during any stage of the message handling may be detected by the receiver, which could then inform the EIS of the problem directly, for example through a response message or throwing an exception.

However, some RPD connectors and/or applications may be better served by alternative styles of message handling. For example, if the logic in the application's MDB takes significant time, then the receiver may be blocked from accepting additional messages for that length of time. During message handling, new incoming messages from the EIS may back up, waiting for the receiver to read again. Therefore, in one embodiment, the RPD architecture may provide for the implementation of RPD connectors that provide an alternative method or methods for orchestrating the receipt, processing, and dispatching of messages in the RPD connector.

Figure 5:
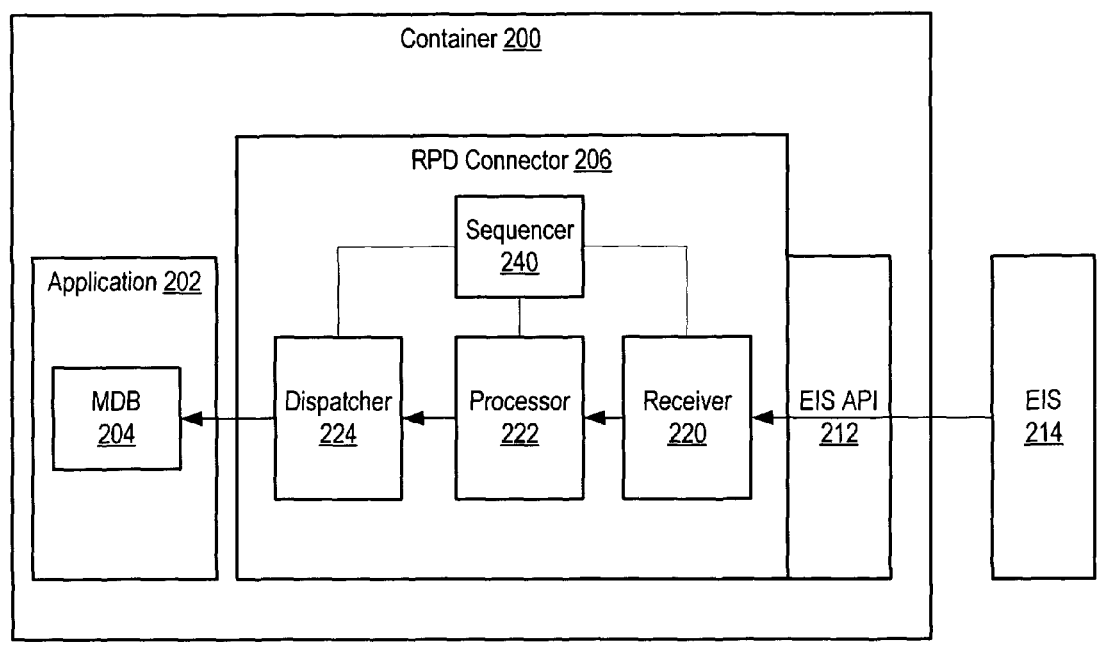
FIG. 5 illustrates an RPD connector with a sequencer according to one embodiment.

In one embodiment, the RPD architecture may include a sequencer component of RPD connectors that may be used to specify whether the processor runs synchronously or asynchronously with the receiver and whether the dispatcher(s) run synchronously or asynchronously with each other and the processor. FIG. 5 illustrates an RPD connector with a sequencer according to one embodiment. The sequencer 240 may be used to control when the receiver 220, processor 222, and dispatcher(s) 224 execute with respect to each other. For example, a developer may want the RPD connector 206 to receive a message, then process it, and then dispatch it before accepting another message from the EIS 214. Alternatively, a developer may prefer that, once a message is received from the EIS 214, the processing and dispatching occur in parallel with the next receipt of a message. The sequencer 240 may be used to determine whether message handling by the other components is performed serially or whether part or all may be performed concurrently. In one embodiment, the default behavior of the sequencer implements strictly serial message handling as described above, and developers may provide alternative implementations if they want their RPD connectors to behave differently.

RPD Connector Builder Mechanism

An exemplary RPD connector builder mechanism is described that may accept information specific to an EIS/application interface and automatically generate a custom RPD connector for the EIS/application interface according to the specific information. In one embodiment, the RPD connector builder mechanism, or RPD connector builder for short, may provide or generate most of the logic needed for RPD connectors, and the developer may provide some code and/or modifications to the generated code specific to the EIS. Thus, the RPD connector builder may generate much of the RPD connector implementation for the developer, thus reducing the amount of customization needed, and may organize the RPD connector according to the common RPD architecture so that the developer can perform any customization quickly and accurately.

In one embodiment, the RPD connector builder provides a user interface that allows a developer to describe the characteristics of the EIS of interest. The RPD connector builder then generates all or almost all of the RPD connector code. In one embodiment, the RPD connector builder generates RPD connectors according to the RPD architecture described herein. This allows the RPD connector builder to manage and coordinate how the components of the RPD architecture (receiver, processor and dispatcher) work together, while leaving the developer with only a few points where custom-written logic may be required according to the specifics of the EIS.

The RPD connector builder may allow users to define and generate RPD connectors that comply with the RPD connector architecture and make use of particular EISs. In one embodiment, the user enters information about the EIS and its API into a user interface of the RPD connector builder, and makes specific choices about the behavior the RPD adapter should have: e.g., transactional support, security authentication, etc. Then, the RPD connector builder combines the user's input with its own intelligence about how J2EE Connector Specification-compliant adapters should behave, and generates Java code that implements a specification-compliant RPD connector for that user's particular EIS. In one embodiment, the user may need to customize a few points in the generated code to provide logic that the RPD connector builder cannot generate itself. An example of the sort of logic that may require customization is how the EIS API should be used to establish a new physical connection to the EIS so that the adapter and the EIS can exchange messages.

Once the user has customized the generated RPD connector (if necessary), the RPD connector builder may be used to build the RPD connector and package it. The resulting RPD connector archive contains the RPD connector and everything needed for its proper operation, and the archive is ready for deployment into any J2EE-compliant container.

In one embodiment, the generated RPD connector complies with the J2EE Connector specification. In one embodiment, the RPD connector may also include other features, such as logging and exception handling, which are beyond what is required by the J2EE Connector specification.

In one embodiment, the RPD connector builder may provide an implementation of the service provider interface (SPI) for non-managed environments such as Web servers and stand-alone Java virtual machines (JVMs).

Certain behavior is common to all connectors. In addition to generating the components of RPD connectors that may vary from one RPD adapter to the next, the RPD connector builder may provide an extensive framework of classes that are common to all connectors. In one embodiment, the classes generated by the RPD connector builder are subclasses of the classes in the common framework, and these subclasses may implement only the connector-specific behavior. The common superclasses provide the common, connector-independent logic.

In one embodiment, the developer may need to customize certain parts of the RPD adapter that the RPD connector builder cannot generate. In one embodiment, the RPD connector builder may allow the developer to regenerate the RPD connector as many times as needed, and may preserve customizations that the developer has already implemented in previously generated classes.

Figure 6:
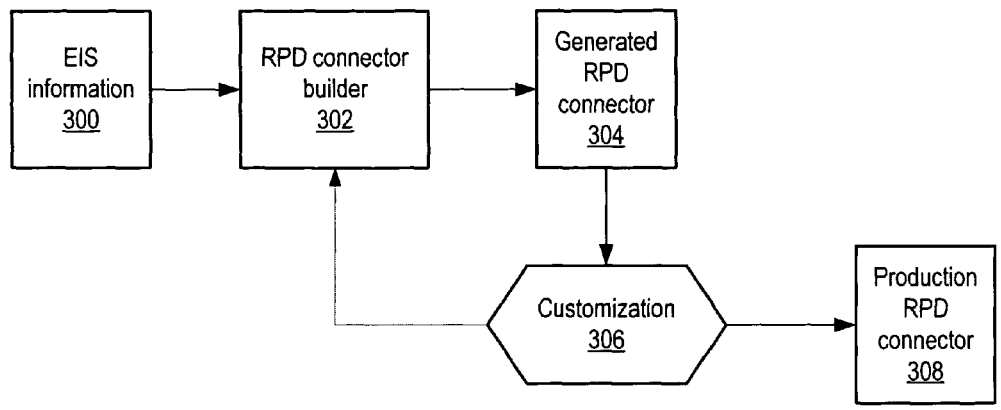
FIG. 6 illustrates using an RPD connector builder to generate an RPD connector according to one embodiment.

FIG. 6 illustrates using an RPD connector builder to generate an RPD connector according to one embodiment. The developer may input EIS and possibly other information 300 into the RPD connector builder 302. The RPD connector builder 302 may generate an RPD connector 304 according to the input EIS information 300. If necessary or desired, the developer may customize 306 the RPD connector 304 according to the specific EIS by adding code and/or modifying generated code to generate a production RPD connector 308. In one embodiment, the RPD connector may be regenerated, if necessary or desired, preserving customizations.

Figure 7:
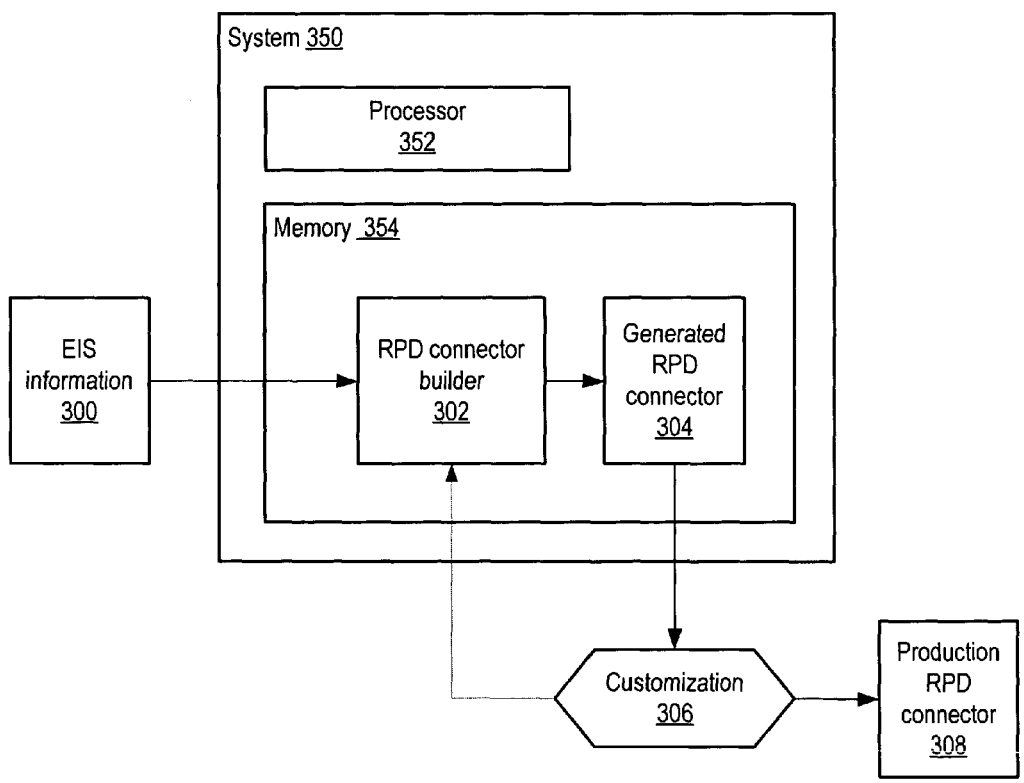
FIG. 7 illustrates a system implementing an RPD connector builder according to one embodiment.

FIG. 7 illustrates a system implementing an RPD connector builder according to one embodiment. System 350 may be any of various types of devices, including, but not limited to, a personal computer system, desktop computer, laptop or notebook computer, mainframe computer system, workstation, network computer, or other suitable device. System 350 may include at least one processor 352. The processor 352 may be coupled to a memory 354. Memory 354 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 350 may couple over a network to one or more other devices via one or more wired or wireless network interfaces.

System 350 may include, in memory 354, an embodiment of an RPD connector builder 302 as described herein. The developer may input EIS and possibly other information 300 into the RPD connector builder 302. The RPD connector builder 302 may generate an RPD connector 304 according to the input EIS information 300. If necessary or desired, the developer may customize 306 the RPD connector 304 according to the specific EIS by adding code and/or modifying generated code to generate a production RPD connector 308. In one embodiment, the RPD connector may be regenerated, if necessary or desired, preserving customizations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising: one or more physical computer systems configured to implement:
   an enterprise information system (EIS); and
   an application server comprising:
      an application comprising a plurality of application components; and
      a connector configured to deliver inbound messages from the EIS to the application, wherein the connector comprises:
         a receiver component configured to receive a plurality of inbound messages from the EIS;
         a processor component configured to, for each of the plurality of inbound messages received by the receiver component, determine a particular one or more application components from among the plurality of application components to receive the respective inbound message; and
         a plurality of dispatcher components each configured to deliver a particular one of the plurality of inbound messages received by the receiver component to a particular one of the particular one or more application components determined by the processor component to receive the respective inbound message, wherein the connector is configured to create at least one of the plurality of dispatcher components in response to the processor component determining a particular application component to receive a particular inbound message, and wherein the created dispatcher component is configured to deliver the particular inbound message to the particular application component.

2. The system as recited in claim 1, wherein the receiver component is further configured to maintain an open connection to the EIS.

3. The system as recited in claim 1, wherein the receiver component encapsulates all dependencies of the connector on the EIS.

4. The system as recited in claim 1, wherein each dispatcher component encapsulates all dependencies of the connector on the corresponding particular one of the application components.

5. The system as recited in claim 1, wherein at least one of the plurality of application components is a message-driven bean (MDB).

6. The system as recited in claim 1, wherein the application server further comprises an EIS application programming interface (API) for the EIS, wherein the receiver component is further configured to interact with the EIS according to the EIS API.

7. The system as recited in claim 1, wherein the connector further comprises a set of one or more message endpoints, wherein each of the one or more message endpoints indicates one of the application components as a destination for incoming messages from the EIS.

8. The system as recited in claim 7, wherein, to determine a particular one or more application components from among the plurality of application components to receive the respective inbound message, the processor component is configured to select a particular one or more message endpoints indicating the particular one or more application components from among the set of one or more message endpoints.

9. The system as recited in claim 1, wherein the connector is further configured to create the processor component after receiving at least one of the plurality of inbound messages from the EIS.

10. The system as recited in claim 1, wherein the receiver component, the processor component, and the plurality of dispatcher components are configured to process inbound messages received from the EIS serially, wherein, to process inbound messages received from the EIS serially, the receiver component waits for the plurality of dispatcher components to deliver the inbound messages to the application components before accepting a next inbound message from the EIS.

11. The system as recited in claim 1, wherein the receiver component, the processor component, and the plurality of dispatcher components are configured to process inbound messages received from the EIS asynchronously, wherein, to process inbound messages received from the EIS asynchronously, the receiver component does not wait for the plurality of dispatcher components to deliver the inbound messages to the application components before accepting a next inbound message from the EIS.

12. The system as recited in claim 1, wherein the connector is further configured to conform to Java 2 Enterprise Edition (J2EE) Connector Specifications.

13. The system as recited in claim 1, wherein the application server is a Java 2 Enterprise Edition (J2EE) application server.

14. A system, comprising:
   a processor; and
   a memory comprising program instructions, wherein the program instructions are executable by the processor to implement an RPD (receiver-processor-dispatcher) connector builder configured to generate RPD connectors, wherein each RPD connector is configured to deliver inbound messages from an Enterprise Information System (EIS) to an application on an application server;
   wherein each RPD connector comprises a receiver component configured to receive a plurality of inbound messages from the EIS;
   wherein each RPD connector is further configured to:
      generate a processor component configured to, for each of the plurality of inbound messages, determine a particular one or more application components from among a plurality of application components of the application to receive the respective inbound message; and
      generate a plurality of dispatcher components each configured to deliver a particular one of the plurality of inbound messages to a particular one of the particular one or more application components determined by the processor component to receive the respective inbound message, wherein each RPD connector is configured to create at least one of the plurality of dispatcher components in response to the processor component determining a particular application component to receive a particular inbound message, and wherein the created dispatcher component is configured to deliver the particular inbound message to the particular application component.

15. The system as recited in claim 14, wherein the receiver component is further configured to maintain an open connection to the EIS.

16. The system as recited in claim 14, wherein the receiver component encapsulates all dependencies of the RPD connector on the EIS.

17. The system as recited in claim 14, wherein each dispatcher component encapsulates all dependencies of the RPD connector on the corresponding particular one of the application components.

18. The system as recited in claim 14, wherein the RPD connector builder is further configured to generate the RPD connectors according to Java 2 Enterprise Edition (J2EE) Connector Specifications.

19. The system as recited in claim 15, wherein the RPD connector builder is further configured to generate each RPD connector according to information specific to a particular EIS.

20. A system, comprising:
  connector means configured to deliver inbound messages from an Enterprise Information System (EIS) to an application on an application server, comprising:
    means for receiving a plurality of inbound messages from the EIS;
    means for determining, for each of the plurality of inbound messages, a particular one or more application components from among a plurality of application components of the application to receive the respective inbound message; and
    means for delivering each particular one of the plurality of inbound messages to a particular one of the particular one or more application components determined to receive the respective inbound message, wherein the connector means creates the means for delivering in response to the means for determining a particular application component to receive a particular inbound message, and wherein the created means for delivering delivers the particular inbound message to the particular application component.

21. A method, comprising:
  a receiver component of a connector configured to deliver inbound messages from an enterprise information system (EIS) to an application on an application server receiving a plurality of inbound messages from the EIS;
  a processor component of the connector determining, for each of the plurality of inbound messages received by the receiver component, a particular one or more application components from among a plurality of application components of the application to receive the respective inbound message;
  creating a plurality of dispatcher components, wherein at least one of the plurality of dispatcher components is created in response to determining a particular application component to receive a particular inbound message, and wherein the created dispatcher component is configured to deliver the particular inbound message to the particular application component; and
  the plurality of dispatcher components of the connector each delivering a particular one of the plurality of inbound messages received by the receiver component to a particular one of the particular one or more application components determined by the processor component to receive the respective inbound message.

22. The method as recited in claim 21, further comprising the receiver component maintaining an open connection to the EIS.

23. The method as recited in claim 21, wherein the receiver component encapsulates all dependencies of the connector on the EIS.

24. The method as recited in claim 21, wherein each dispatcher component encapsulates all dependencies of the connector on the corresponding particular one of the application components.

25. The method as recited in claim 21, wherein at least one of the plurality of application components is a message-driven bean (MDB).

26. The method as recited in claim 21, wherein said receiving a plurality of inbound messages from the EIS comprises the receiver component receiving the plurality of inbound messages according to an EIS application programming interface (API) for the EIS.

27. The method as recited in claim 26, wherein said determining a particular one or more application components from among the plurality of application components to receive the respective inbound message comprises the processor component selecting a particular one or more message endpoints indicating the particular one or more application components from a set of message endpoints, wherein each of the one or more message endpoints indicates one of the application components as a destination for incoming messages from the EIS.

28. The method as recited in claim 21, further comprising creating the processor component after receiving at least one of the plurality of inbound messages from the EIS.

29. The method as recited in claim 21, further comprising the receiver component waiting for the plurality of dispatcher components to deliver the inbound messages to the application components before accepting a next inbound message from the EIS.

30. The method as recited in claim 21, further comprising the receiver component accepting a next inbound message from the EIS before the mere plurality of dispatcher components deliver the inbound messages to the application components.

31. The method as recited in claim 21, wherein the connector conforms to Java 2 Enterprise Edition (J2EE) Connector Specifications.

32. The method as recited in claim 21, wherein the application server is a Java 2 Enterprise Edition (J2EE) application server.

33. A computer-accessible storage medium comprising program instructions, wherein the program instructions are computer-executable to implement:
  a receiver component of a connector configured to deliver inbound messages from an enterprise information system (EIS) to an application on an application server receiving a plurality of inbound messages from the EIS;
  a processor component of the connector determining, for each of the plurality of inbound messages received by the receiver component, a particular one or more application components from among a plurality of application components of the application to receive the respective inbound message; and
  creating a plurality of dispatcher components, wherein at least one of the plurality of dispatcher components is created in response to determining a particular application component to receive a particular inbound message, and wherein the created dispatcher component is configured to deliver the particular inbound message to the particular application component; and
  the plurality of dispatcher components of the connector each delivering a particular one of the plurality of inbound messages received by the receiver component to a particular one of the particular one or more application components determined by the processor component to receive the respective inbound message.

34. The computer-accessible storage medium as recited in claim 33, wherein the program instructions are further executable to implement the receiver component maintaining an open connection to the EIS.

35. The computer-accessible storage medium as recited in claim 33, wherein the receiver component encapsulates all dependencies of the connector on the EIS.

36. The computer-accessible storage medium as recited in claim 33, wherein each dispatcher component encapsulates all dependencies of the connector on the corresponding particular one of the application components.

37. The computer-accessible storage medium as recited in claim 33, wherein at least one of the plurality of application components is a message-driven bean (MDB).

38. The computer-accessible storage medium as recited in claim 33, wherein, in said receiving a plurality of inbound messages from the EIS, the program instructions are further executable to implement the receiver component receiving the plurality of inbound messages according to an EIS application programming interface (API) for the EIS.

39. The computer-accessible storage medium as recited in claim 38, wherein, in said determining a particular one or more application components from among the plurality of application components to receive the respective inbound message, the program instructions are further executable to implement the processor component selecting a particular one or more message endpoints indicating the particular one or more application components from a set of message endpoints, wherein each of the one or more message endpoints indicates one of the application components as a destination for incoming messages from the EIS.

40. The computer-accessible storage medium as recited in claim 33, wherein the program instructions are further executable to implement creating the processor component after receiving at least one of the plurality of inbound messages from the EIS.

41. The computer-accessible storage medium as recited in claim 33, wherein the program instructions are further executable to implement the receiver component waiting for the plurality of dispatcher components to deliver the inbound messages to the application components before accepting a next inbound message from the EIS.

42. The computer-accessible storage medium as recited in claim 33, wherein the program instructions are further executable to implement the receiver component accepting a next inbound message from the EIS before the plurality of dispatcher components deliver the inbound messages to the application components.

43. The computer-accessible storage medium as recited in claim 33, wherein the connector conforms to Java 2 Enterprise Edition (J2EE) Connector Specifications.

44. The computer-accessible storage medium as recited in claim 33, wherein the application server is a Java 2 Enterprise Edition (J2EE) application server.

\* \* \* \* \*

UNITED STATES PATENT AND TRADEMARK OFFICE
CERTIFICATE OF CORRECTION

PATENT NO. : 7,802,260 B1  Page 1 of 1
APPLICATION NO. : 10/914402
DATED : September 21, 2010
INVENTOR(S) : Timothy J. Quinn et al.

It is certified that error appears in the above-identified patent and that said Letters Patent is hereby corrected as shown below:

In the Claims:

Claim 19, col. 15, line 5, please delete "15" and insert --14-- in place thereof.

Signed and Sealed this

Twenty-first Day of December, 2010

David J. Kappos
*Director of the United States Patent and Trademark Office*